United States Patent [19]

Grose et al.

[11] 4,124,686
[45] Nov. 7, 1978

[54] CRYSTALLINE ZEOLITE PHI

[75] Inventors: Robert W. Grose, Mobile, Ala.; Edith M. Flanigen, White Plains, N.Y.

[73] Assignee: Union Carbide Corporation, New York, N.Y.

[21] Appl. No.: 853,762

[22] Filed: Nov. 21, 1977

Related U.S. Application Data

[63] Continuation-in-part of Ser. No. 456,803, Apr. 1, 1974, abandoned.

[51] Int. Cl.$^2$ .......................... C01B 33/28; C07F 5/06
[52] U.S. Cl. .................................. 423/328; 252/455 Z; 260/448 C; 423/329
[58] Field of Search ............... 423/328, 329, 330, 118; 260/448 C; 252/455 Z

[56] References Cited

U.S. PATENT DOCUMENTS

| | | | |
|---|---|---|---|
| 3,030,181 | 4/1962 | Milton | 423/328 |
| 3,248,170 | 4/1966 | Kuetinskas | 423/328 |
| 3,306,922 | 2/1967 | Barber et al. | 260/448 C |
| 3,642,434 | 2/1972 | Dwyer | 423/329 |
| 3,649,178 | 3/1972 | Wang | 423/329 |
| 3,923,639 | 12/1975 | Ciric | 208/111 |

Primary Examiner—Edward J. Meros
Attorney, Agent, or Firm—Richard G. Miller

[57] ABSTRACT

A novel synthetic crystalline zeolite denominated zeolite "Phi" is prepared hydrothermally from aqueous gels in the $[N(CH_3)_4]_2O - Na_2O - Al_2O_3 - SiO_2$ system. As synthesized, the zeolite exhibits large-pore adsorption characteristics, a characteristic X-ray powder diffraction pattern and a composition expressed in moles of oxides as: 0.95–1.05 $Na_2O$:0.02–0.05 $\{N(CH_3)_4\}_2O$:$Al_2O_3$:4–7 $SiO_2$:0–6 $H_2O$.

2 Claims, No Drawings

CRYSTALLINE ZEOLITE PHI

RELATED APPLICATIONS

This is a continuation-in-part of copending application Ser. No. 456,803, filed Apr. 1, 1974, now abandoned.

The present invention relates in general to a novel synthetic crystalline aluminosilicate of the molecular sieve type and to the hydrothermal method for its preparation. The composition is hereinafter denominated zeolite "Phi."

As is the case with the other and prior known crystalline zeolites, zeolite Phi structurally consists basically of an open three-dimensional framework of $SiO_4$ and $AlO_4$ tetrahedra which are cross-linked by the sharing of oxygen atoms so that the ratio of oxygen atoms to the total of the framework aluminum and silicon atoms is two, i.e. $O/(Si+Al) = 2$. The negative electrovalence of the $AlO_4-$ tetrahedra is balanced by the inclusion of cations within the crystal.

The composition of crystalline zeolite Phi can be expressed stoichiometrically in terms of moles of oxides as follows:

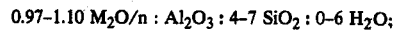

$0.97-1.10\ M_2O/n : Al_2O_3 : 4-7\ SiO_2 : 0-6\ H_2O;$ wherein "M" is at least one cation species having a valence of "n." Most commonly the zeolitic cations are a mixture of alkylammonium with one or more of hydrogen, ammonium or metal. As synthesized, the cations in zeolite Phi are sodium cations and tetramethylammonium cations; its chemical composition can be expressed in terms of moles of oxides as follows:

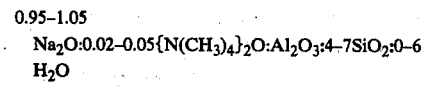

$0.95-1.05\ Na_2O:0.02-0.05\{N(CH_3)_4\}_2O:Al_2O_3:4-7SiO_2:0-6\ H_2O$

In conjunction with its empirical chemical composition, zeolite Phi can be identified and distinguished from other zeolite species by its X-ray powder diffraction pattern. The X-ray date for a typical sample of zeolite Phi, prepared in accordance with Example 1 set forth hereinafter, is shown in Table A below.

TABLE A

| Bragg Angle, 2θ Observed | Interplanar Spacing d(A) Observed | Relative Intensity |
|---|---|---|
| 7.6 | 11.63 | M |
| 9.3 | 9.51 | S |
| 11.5 | 7.69 | VW |
| 12.7 | 6.97 | S |
| 15.8 | 5.61 | S |
| 17.6 | 5.04 | S |
| 20.6 | 4.31 | S |
| 22.4 | 3.97 | VW |
| 26.0 | 3.43 | VS |
| 30.6 | 2.92 | VS |
| 33.3 | 2.69 | VW |
| 34.4 | 2.61 | W |
| 35.8 | 2.51 | VW |
| 43.2 | 2.09 | W |
| 47.8 | 1.90 | W |
| 50.3 | 1.81 | W |
| 52.5 | 1.74 | VW |
| 53.1 | 1.72 | W |

W = weak
S = strong
VS = very strong
VW = very weak
M = medium

Standard techniques were employed to obtain the foregoing data. The radiation was the K-alpha doublet of copper, and a Geiger-counter spectrometer with a stripchart pen recorder was used. The peak heights and their positions as a function of 2 times theta (θ), where theta is the Bragg angle, were read from the spectrometer chart. From these the relative intensities of the peaks were expressed as "VS," very strong; "S," strong; "M," medium; "W," weak; and "VW," very weak, and "d(A), observed," the interplanar spacing in Angstrom units corresponding to the recorded lines, were determined. The particular X-ray technique and/or apparatus employed, the humidity, the temperature, the orientation of the powder crystals and other variables, all of which are well known and understood by those skilled in the art of X-ray crystallography or diffraction, can cause some variation in the intensities and positions of the X-ray lines.

It is not, however, necessary to use all of the lines of the pattern of Table A to characterize zeolite Phi as a unique zeolite species and to distinguish it from all other crystalline zeolites. It is sufficient for such purposes that the characterizing X-ray diffraction pattern of zeolite Phi have at least those d-spacings given in Table B below. The tolerance values assigned in Table B provide for the variations in positions of the lines due to the factors referred to above.

TABLE B

| Interplanar Spacing, d(A) | Relative Intensity |
|---|---|
| 11.6 ± 0.2 | M |
| 9.5 ± 0.2 | S |
| 7.00 ± 0.15 | S |
| 5.61 ± 0.10 | S |
| 5.04 ± 0.08 | S |
| 4.31 ± 0.08 | S |
| 3.43 ± 0.06 | VS |
| 2.92 ± 0.05 | VS |
| 2.61 ± 0.05 | W |
| 2.09 ± 0.05 | W |

The various ion-exchanged forms of the zeolite exhibit the same essential X-ray pattern as in Table B. Ion-exchange of the sodium cations of the as-synthesized ziolite is readily accomplished using the well-known and conventional techniques. Aqueous solutions of acids such as acetic and hydrochloric are suitable to substitute hydrogen cations into the crystal structure. Solutions of the common water-soluble salts, such as the chlorides and nitrates, of ammonia and the various metals can be used too as ion-exchange media to introduce ammonium and metal cations into the crystal structure. Ion-exchangeable metal cations include those of the alkali and alkaline earth metals and transition metals, i.e. those having atomic numbers of from 21 to 28, from 39 to 46 and from 72 to 78.

The organic cations of the as-synthesized zeolite are not considered to be ion-exchangeable in the ordinary sense due to steric considerations of the crystal structure, the organic cations themselves and the positions occupied by these cations within the crystal lattice. They can, however, be thermally decomposed to form ion-exchangeable ammonium or hydrogen cations by calcination in air at temperatures of from 400° C. to 650° C. Since, however, there is some overlap in the temperature range suitable for thermal decomposition of the organic and ammonium cations to form hydrogen cations, and the temperature range for dehydroxylation (decationization) of the zeolite, not all of the organic cation sites can be replaced by metal or hydrogen cations by air calcination. It has been proposed however to carry out such a calcination in an environment consisting essentially of ammonia or mixtures thereof with nitrogen. The use of this environment permits somewhat lower calcination temperatures in the range of 500° F. to 1000° F., and results in the preservation of cationic sites in the zeolite products. The procedure is set forth in detail in U.S. Pat. No. 3,853,743 issued Dec. 10, 1974 to A. B. Schwartz, and is incorporated herein in its entirety by reference. Accordingly, by known calcination and ion-exchange techniques, zeolite Phi can be obtained in which the cation population consists essentially of a single cation species such as hydrogen, ammonium or metal.

Zeolite Phi can be prepared hydrothermally by crystallization from a gel whose composition expressed in terms of mole-ratios of oxides falls within the following ranges:

$$\frac{Na_2O}{Na_2O + (Me_4N)_2O} = 0.8 - 0.95;$$

$$\frac{Na_2O + (Me_4N)_2O}{SiO_2} = 0.5 - 0.6;$$

$$SiO_2/Al_2O_3 = 9 - 15;$$

$$\frac{H_2O}{Na_2O + (Me_4N)_2O} = 35 - 50.$$

wherein "Me" represents the methyl group.

In forming the aqueous reaction mixture the conventional reactants used in zeolite synthesis are suitably employed. Alumina can be obtained from activated alumina, alpha alumina, gamma alumina, alumina trihydrate, aluminum hydroxide or sodium aluminate. Sodium hydroxide can supply a portion of all of the sodium ions. Sodium silicates or solid reactive amorphous silicas such as silica residues obtained by acid extraction treatment can serve as the major source of silica for the reaction mixture. Reactive amorphous solid silicas and natural silica-alumina materials modified to achieve high $SiO_2/Al_2O_3$ ratios are the preferred sources of amorphous silica for the reactant mixtures. Such sources include chemically-precipitated silicas, fume silicas, arc silicas, and siliceous materials derived from acid-extracted minerals originally containing quantities of zeolites such as clinoptilolite, chabazite and erionite.

For best results, the crystallization procedure is carried out at temperature in the range of about 90° C. to 105° C., preferably at approximately 100° C., the pressure being atmospheric, or at least that corresponding to the vapor pressure of water in equilibrium with the mixture of reactants. Any suitable heating apparatus, e.g., an oven, sand bath, oil bath, or jacketed autoclave, may be used. Heating is continued until the desired crystalline zeolite Phi product is formed. The zeolite crystals are then filtered off and washed to separate them from the mother liquor. The zeolite crystals are washed, preferably with distilled water, until the effluent wash water, in equilibrium with the product, has a pH of between about 9 and 12.

The method for preparing zeolite Phi is illustrated by the following example.

EXAMPLE 1

A reaction mixture in the tetramethylammonium-sodium-alumina-silica-water system was prepared as follows: 6.0 grams of NaOH, 5.5 grams of $NaAlO_2$, 9.0 grams of $(CH_3)_4$ NOH: $9H_2O$, 18.0 grams of silica and 70.0 grams of water were combined by adding a solution of the first three reactants to a water slurry of the silica. The overall reactant composition of this mixture, in terms of molar ratios of component oxides, was as follows:

$$\frac{Na_2O + (Me_4N)_2O}{SiO_2} = 0.53$$

$$\frac{Na_2O}{Na_2O + (Me_4N)_2O} = 0.8$$

$$SiO_2/Al_2O_3 = 9.5$$

$$\frac{H_2O}{Na_2O + (Me_4N)_2O} = 35.$$

This mixture, in a sealed glass container, was digested and crystallized for 68 hours at 100° C. The solid product was recovered by filtration and washing with water, and finally dried at 110° C.

The silica source used in this synthesis was obtained by acid treatment of a mineral containing chabazite that had been ammonium ion-exchanged. The exchanged zeolite mineral was slurried in 30% sulfuric acid and heated at 300° C. for 1.5 hours. The sulfated cake was leached in hot water, filtered, washed and dried at 110° C.

Chemical analysis was as follows:

| | | |
|---|---|---|
| $Fe_2O_3$ | 2.2 | |
| $Al_2O_3$ | 3.7 | |
| | | Molar $SiO_2/Al_2O_3$ = 36.1 |
| $SiO_2$ | 78.0 | |
| LOI | 15.1 | |

Samples of the recovered zeolite product were submitted for X-ray diffraction examination and wet chemical analysis. The X-ray powder diffraction pattern is presented in Table A.

Chemical analysis gave the following molar composition:

| | |
|---|---|
| $Na_2O$ | 0.99 |
| $(Me_4N)_2O$ | 0.03 |
| $Al_2O_3$ | 1.00 |
| $SiO_2$ | 4.55 |
| $H_2O$ | 5.49 |

Adsorption capacities were measured on samples of this zeolite using a standard McBain adsorption apparatus. The following data were obtained on samples activated at 350° C.:

| | Pressure, Torr | Temp., °C | Wt-% Adsorbed |
|---|---|---|---|
| $O_2$ | 100 | −183 | 12.1 |
| $O_2$ | 750 | −183 | 18.4 |
| N-butane | 750 | 25 | 8.1 |
| Isobutane | 750 | 25 | 2.7 |
| Neopentane | 750 | 25 | 3.5 |
| $(C_4F_9)_3N$ | 0.5 | 50 | 8.0 |

The above McBain data indicate a large-pore characteristic, since $(C_4F_9)_3N$ has a kinetic diameter of 10.2 Å.

Because zeolite Phi possesses pores of large diameter and also the characteristic zeolite crystal structure and properties, it is readily utilized as an adsorbent and a catalyst in those applications heretofore well known in the art. Particularly in its decationized form or in its fully cationized form in which the sodium cations of the crystal lattice have been substantially replaced by Group II-a metal cations such as magnesium, zeolite Phi in conjunction with platinum as a hydrogenation component is advantageously employed in hydrocarbon conversion processes as a catalyst composition. Such hydrocarbon conversion processes are exemplified by insoparaffin alkylation, hydrocracking, isomerization and reforming.

What is claimed is:

1. A synthetic crystalline zeolitic molecular sieve having a composition expressed in terms of moles of oxides as follows:

$$0.97-1.10\ M_2O/n : Al_2O_3 : 4-7\ SiO_2 : 0-6.0\ H_2O,$$

wherein "M" is at least one or a mixture of two or more of hydrogen, alkylammonium, ammonium or metal cations having a valence of "n," said zeolitic molecular sieve having an X-ray powder diffraction pattern containing at least those d-spacings set forth in Table B.

2. A synthetic crystalline, zeolitic molecular seive according to claim 1 wherein the chemical composition in terms of moles of oxides is: $0.95-1.05\ Na_2O:0.02-0.05[(CH_3)_4N]_2O:Al_2O_3:4-7\ SiO_2:014\ 6\ H_2O$.

* * * * *

UNITED STATES PATENT OFFICE
CERTIFICATE OF CORRECTION

Patent No. 4,124,686      Dated November 7, 1978

Inventor(s) Robert W. Grose and Edith M. Flanigen

It is certified that error appears in the above-identified patent and that said Letters Patent are hereby corrected as shown below:

In Column 1, line 25, and in Column 6, line 1, the term "$M_2O/n$" should read --$M_{2/n}O$--

Signed and Sealed this

Thirteenth Day of March 1979

[SEAL]

Attest:

RUTH C. MASON
*Attesting Officer*

DONALD W. BANNER
*Commissioner of Patents and Trademarks*